UNITED STATES PATENT OFFICE 2,165,948

PREPARATION OF SOLUBLE PHOSPHATES

Edward A. Taylor, Shaker Heights, Ohio, assignor to E. I. du Pont de Nemours & Company, Wilmington, Del., a corporation of Delaware No Drawing. Application April 21, 1937,
Serial No. 138,166

1 Claim. (Cl. 23—107)

This invention relates to soluble phosphates, and is particularly directed to processes for producing ammonium or alkali metal phosphates from calcium metaphosphate comprising causing calcium metaphosphate to react, in aqueous solution, with an ammonium or alkali metal compound, the anion of which forms an insoluble product with calcium ions.

The processes hitherto used in the commercial production of phosphates of ammonia, sodium, and other alkali metals consist essentially of first preparing phosphoric acid and then neutralizing this acid with the proper base. In the older method the phosphoric acid is produced by extracting phosphate rock with sulfuric acid. To make sodium phosphates, for instance, from this so-called "wet process" phosphoric acid, the acid is neutralized with soda ash, $Na_2CO_3$, or caustic soda, $NaOH$. Fluorine, iron, and aluminum impurities are precipitated during this neutralization and removed by filtration.

More recently, phosphoric acid made by thermal processes has also been utilized in making alkali phosphates. In thermal processes, a mixture of phosphate rock, silica, and carbon is heated to a high temperature in a blast furnace or electric furnace, and the phosphorus which distills off under these conditions is burned and hydrated to give phosphoric acid. To make sodium orthophosphates from this acid, essentially the same neutralizing procedure is followed as is used with wet-process phosphoric acid. Irrespective of the method of preparing the acid, the processes heretofore used for making phosphates of ammonia, sodium, and other alkali metals have, therefore, consisted simply of neutralizing phosphoric acid with a base.

Calcium metaphosphate has recently become commercially available as a high $P_2O_5$ fertilizer. This calcium metaphosphate is produced at low cost by distilling phosphorus from a mixture of phosphate rock, silica, and carbon in an electric furnace, burning the phosphorus in air, and absorbing the phosphorus pentoxide thus formed in molten phosphate rock. Such a process is capable of considerable operating economies in producing high $P_2O_5$ fertilizers because the separate operations formerly employed for making such fertilizers, consisting of preparing phosphoric acid and absorbing this phosphoric acid in more phosphate rock, are eliminated with resultant savings in plant investment and handling costs.

I have found that phosphates of ammonia and the alkali metals can be produced by causing calcium metaphosphate to react, in aqueous solution, with an ammonium or alkali metal compound, the anion of which forms an insoluble product with calcium ions.

In the processes of my invention, the separate preparation of phosphoric acid as a step in the production of ammonium and alkali metal phosphates is avoided. Furthermore, advantage is taken of the economies inherent in the direct production of calcium metaphosphate as a means of making the $P_2O_5$ content of phosphate rock available for the production of soluble phosphates.

By the application of my novel processes it becomes possible in some instances to achieve further economies by substituting an ammonium or alkali metal salt for at least a part of the ammonia or alkali metal base heretofore used for neutralizing phosphoric acid.

A consideration of the chemical reactions involved in the production of alkali metal phosphates from calcium metaphosphate will more clearly point out the novel features of my invention. Calcium metaphosphate is, of course, first produced by the process employed in making high $P_2O_5$ fertilizers. In this process, as has been pointed out, phosphate rock (essentially tricalcium phosphate, $Ca_3(PO_4)_2$) is heated with silica and carbon, and phosphorus is distilled off. The phosphorus is burned in air to give phosphorus pentoxide, $P_2O_5$, which is then absorbed in molten phosphate rock to give calcium metaphosphate, $Ca(PO_3)_2$.

Equations 1, 2, and 3, below, show these transitions of the phosphorus:

(1) $\quad 2Ca_3(PO_4)_2 \rightarrow 4P + \text{slag}$
(2) $\quad\quad\quad 4P + 5O_2 \rightarrow 2P_2O_5$
(3) $\quad 2P_2O_5 + Ca_3(PO_4)_2 \rightarrow 3Ca(PO_3)_2$

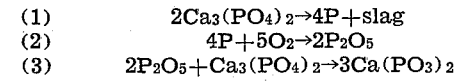

In producing an alkali metal phosphate such as monosodium orthophosphate by a process of my invention calcium metaphosphate, prepared in such a manner as shown above, is treated with a solution of a sodium compound whose anions form an insoluble product with calcium ions, such as, for instance, sodium sulfate, according to the equation:

(4) $\quad 3Ca(PO_3)_2 + 3Na_2SO_4 \rightarrow 3CaSO_4 + 6NaPO_3$

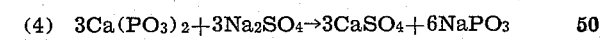

The insoluble calcium sulfate, $CaSO_4$, is removed in any suitable manner, as for instance by filtration. A solution of sodium metaphosphate, $NaPO_3$, may thus be obtained. This metaphosphate tends to react with water to give monosodium orthophosphate, $NaH_2PO_4$, as follows:

(5) $\quad 6NaPO_3 + 6H_2O \rightarrow 6NaH_2PO_4$

A simplified expression showing the proportions of phosphate rock and sodium sulfate used, and monosodium phosphate obtained may be represented as follows:

(6) $\quad Ca_3(PO_4)_2 + Na_2SO_4 \rightarrow 2NaH_2PO_4$

By directly absorbing $P_2O_5$ in molten phosphate rock, as shown in Equations 1, 2, and 3, above the phosphate content of three mols of tricalcium phosphate is made available in the form of calcium metaphosphate, altho only two mols of tricalcium phosphate are actually decomposed. If the phosphate content of the same three mols of tricalcium phosphate were to be made available as phosphoric acid, it would be necessary to decompose completely all three mols. By using calcium metaphosphate as a phosphate source in the production of soluble alkali metal phosphates according to a process of my invention, the cost of decomposing one mol of tricalcium phosphate in every three is saved.

The following examples show certain specific embodiments of my novel processes and their manner of application to the production of soluble alkali phosphates from calcium metaphosphate. Example I shows the recovery of $P_2O_5$ which can be effected by extracting calcium metaphosphate with a sodium sulfate solution.

*Example I*

The calcium metaphosphate used in this example was made by absorbing $P_2O_5$ in molten phosphate rock and contained about 65.4 per cent of combined $P_2O_5$ and 22.2 per cent of combined CaO. Twenty-one and eight-tenths parts of this finely ground calcium metaphosphate were added to a solution containing 14.25 parts of sodium sulfate ($Na_2SO_4$) in 60.8 parts of water. The mixture was heated for two hours at 95 to 100° C. with agitation. The precipitated calcium sulfate sludge was filtered off and thoroughly washed, and the wash water was combined with the filtrate.

The $P_2O_5$ content of the combined filtrate and wash water was determined. It was found that about 82.7 per cent of the combined $P_2O_5$ added as calcium metaphosphate was present in the filtrate and wash water as soluble sodium phosphates.

In the following example it is shown that a satisfactory recovery of $P_2O_5$ values is also obtained by extracting calcium metaphosphate with water and adding the calcium precipitant to the solution thus obtained, in accordance with a process of my invention.

*Example II*

A calcium metaphosphate solution was made up in the following manner:

A crude calcium metaphosphate containing about 65.4 per cent of combined $P_2O_5$ and 22.2 per cent of combined CaO was prepared by treating phosphate rock with $P_2O_5$. One hundred parts of this crude metaphosphate was suspended in 279 parts of water and the suspension was heated for two hours at 95 to 100° C. with agitation. The suspension was then filtered and the residue was washed with 56 parts of hot water. The filtrate and wash water were combined, 322 parts of calcium metaphosphate solution being thus obtained. By analysis this solution was found to contain 16.6 per cent of $P_2O_5$ in the form of calcium phosphates, equivalent to 82 per cent of the total $P_2O_5$ added as calcium metaphosphate.

To 130 parts of this calcium metaphosphate solution was added 21.58 parts of sodium sulfate, and the mixture was agitated for two hours at 95° C. The precipitated calcium sulfate sludge was then filtered off and washed with 100 parts of hot water. One hundred ninety-seven parts of filtrate were obtained. By analysis this filtrate was found to contain 10.95 per cent of $P_2O_5$ present in the solution before the sodium sulfate was added.

In the following example a procedure is shown by which ammonium phosphates may also be produced from calcium metaphosphate by a process of my invention.

*Example III*

A sample of calcium metaphosphate was extracted with water to give 50 parts of a liquor containing 13.75 per cent of $P_2O_5$. To this calcium metaphosphate solution was added 6.4 parts of ammonium sulfate to precipitate calcium sulfate and form ammonium phosphates. The mixture was heated to 95° C. and agitated for one hour. The precipitated calcium sulfate was then filtered off and washed with 38 parts of water. The combined filtrate and washings contained ammonium phosphates equivalent to 99.1% of the $P_2O_5$ present in the original extract liquor.

It will be understood that the above examples are given merely to explain and illustrate the nature of my invention, and that the scope of my invention is not limited to the particular conditions of these examples.

The calcium metaphosphate I use in my novel processes may be a commercial product such as is obtained by absorbing $P_2O_5$ in fused phosphate rock. Commercial calcium metaphosphate prepared in this manner gives an acidic solution when extracted with water. The presence of free phosphoric acids does not prevent the operation of the processes of my invention. Any such free acid may be neutralized, if desired, by addition of a suitable base.

Fluorine impurities in the calcium metaphosphate used in a process of my invention are likewise not detrimental since any fluorine found in the alkali metal phosphate solutions may readily be removed by methods already known to the art, as, for instance, by precipitation as sodium fluosilicate.

The compound reacted with the calcium metaphosphate must be one which in solution gives cations of the metal whose phosphate it is desired to produce. In Examples I and II, for instance, a compound of sodium was used since it was desired to produce sodium phosphate. Similarly, if potassium phosphate were to be produced, a potassium compound, such as potassium sulfate, would be employed.

In my novel processes, the compound reacted with calcium metaphosphate must also be one whose anions form an insoluble product with calcium ions. Such compounds as, for instance, sulfates, carbonates, and hydroxides, may be used. In the above examples I have shown the use of sulfates as calcium precipitants. Since the sulfates are in most instances the cheapest compounds of ammonia and alkali metals which can be used in the processes of my invention, and in most instances give better yields of the finished products, I generally prefer to use the sulfates for economic reasons.

The manner of dissolving calcium metaphosphate for use in a process of my invention may be varied considerably, as will be noted from the above examples. The calcium metaphosphate may be ground to a powder and added directly to the solution containing the calcium precipitant, as in Example I, or it may be extracted with water to give a solution to which the calcium precipitant is then added, as in Example II.

The heating and agitating of the reaction mixtures shown in the above examples expedite the progress of the reaction, and if lower temperatures are used, and if agitation is not employed, a longer reaction time must be allowed.

The calcium sulfate sludge formed by the reaction of calcium metaphosphate with a calcium precipitant according to my novel processes may be removed by any of several methods well known in the art. It may, for example, be filtered off on a filter-press, or it may be concentrated and removed by such gravitational methods as counter-current extraction, as for instance, in a Dorr thickener.

The concentrations of the calcium metaphosphate and calcium precipitant solutions may be widely varied. I prefer to start with solutions as concentrated as can be conveniently handled because the amount of subsequent concentration required is thereby minimized. The concentrations shown in the above examples were found to be satisfactory and convenient under the conditions of these examples.

I claim:

In a process for producing soluble phosphates, the step comprising treating calcium di-metaphosphate made by adsorbing $P_2O_5$ in molten phosphate rock, in aqueous solution, with a sulfate the cation of which is included in the group consisting of ammonium and sodium ions.

EDWARD A. TAYLOR.